Sept. 10, 1929.    C. T. SIEBERT, JR., ET AL    1,727,677
VALVE
Filed April 3, 1926    4 Sheets-Sheet 3

Witnesses:
Edwin Trueb

Inventors:
CHARLES T. SIEBERT, JR.
and BRUCE WALTER.
by D. Anthony Usina
their Attorney.

Sept. 10, 1929.　　　C. T. SIEBERT, JR., ET AL　　　1,727,677
VALVE
Filed April 3, 1926　　　4 Sheets-Sheet 4

Witnesses:
Edwin Trueb

Inventors:
CHARLES T. SIEBERT, JR.,
and BRUCE WALTER.
D. Anthony Usina
their Attorney.

Patented Sept. 10, 1929.

1,727,677

UNITED STATES PATENT OFFICE.

CHARLES T. SIEBERT, JR., AND BRUCE WALTER, OF PITTSBURGH, PENNSYLVANIA, ASSIGNORS TO ARTHUR G. McKEE & COMPANY, OF CLEVELAND, OHIO, A CORPORATION OF DELAWARE.

VALVE.

Application filed April 3, 1926. Serial No. 99,528.

This invention relates to valves and, more particularly, to plate valves, and has for its object the provision of a novel form of seat for valves of this class.

Another object of this invention is to provide a novel form of seat operating mechanism for sealing against the valve plate and releasing the seat from sealing engagement with the valve plate.

A further object is to provide a valve having the novel construction, arrangement and combination of parts hereinafter described and illustrated in the accompanying drawings.

Figure 1:
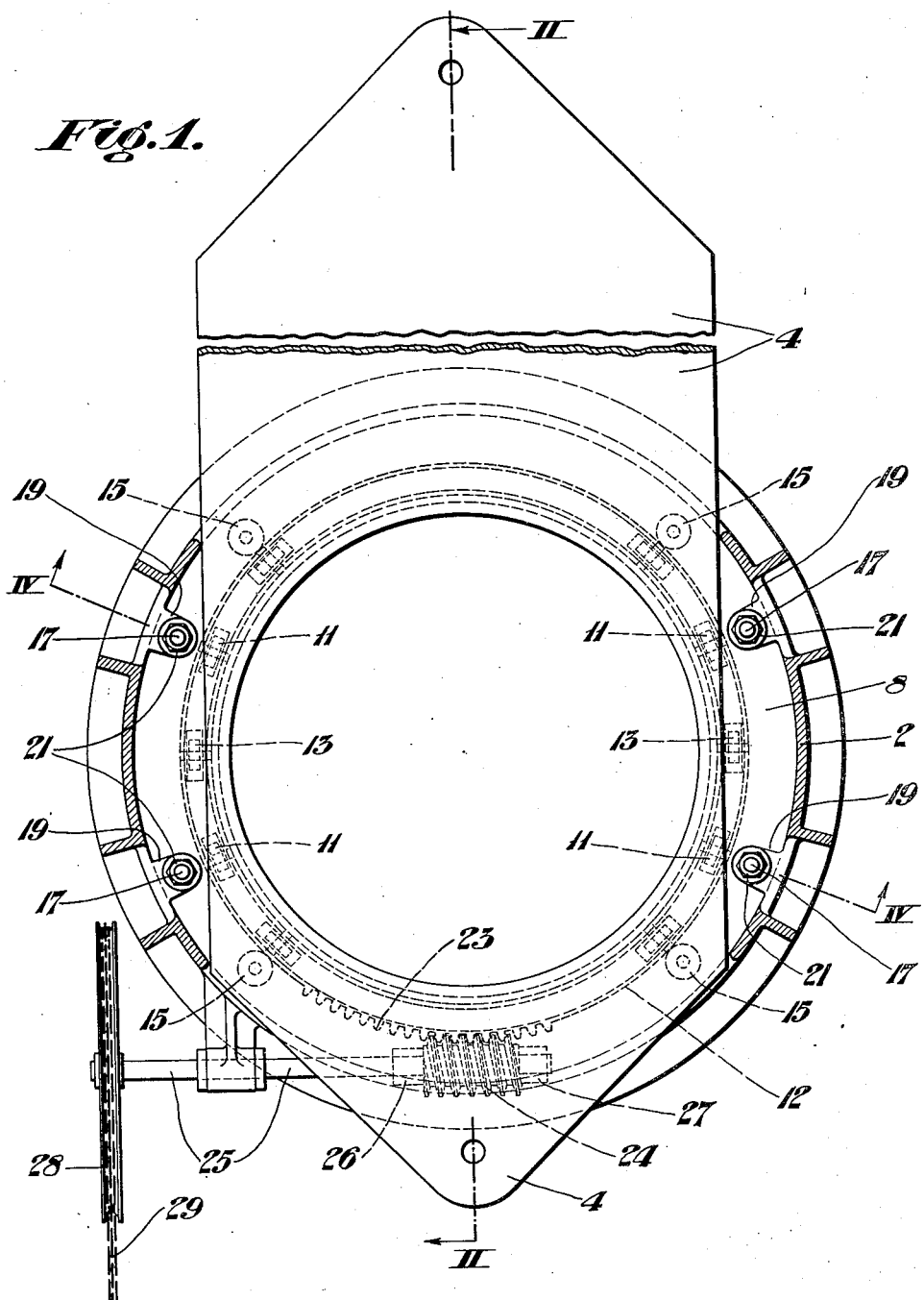
Figure 1 is a sectional elevation on the line I—I of Figure 2, showing the valve plate in plan.
Figure 2:
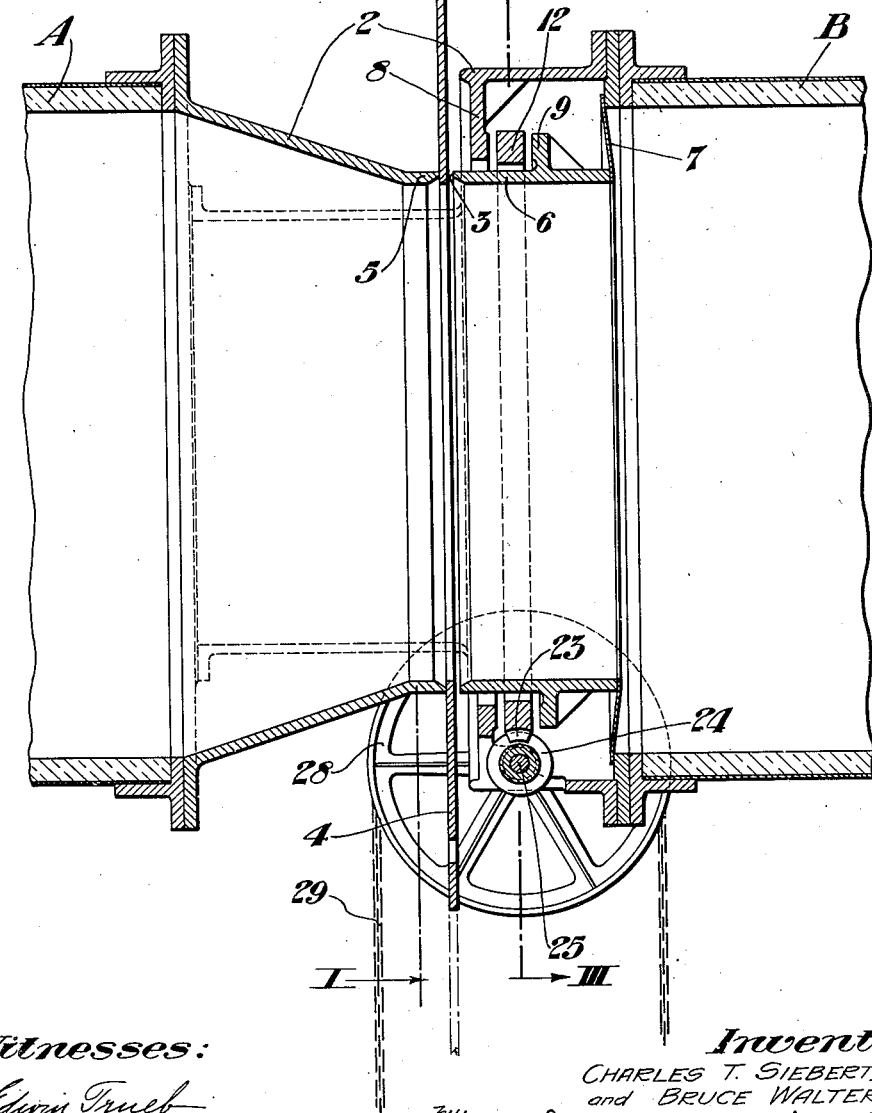
Figure 2 is a sectional elevation on the line II—II of Figure 1.
Figure 3:
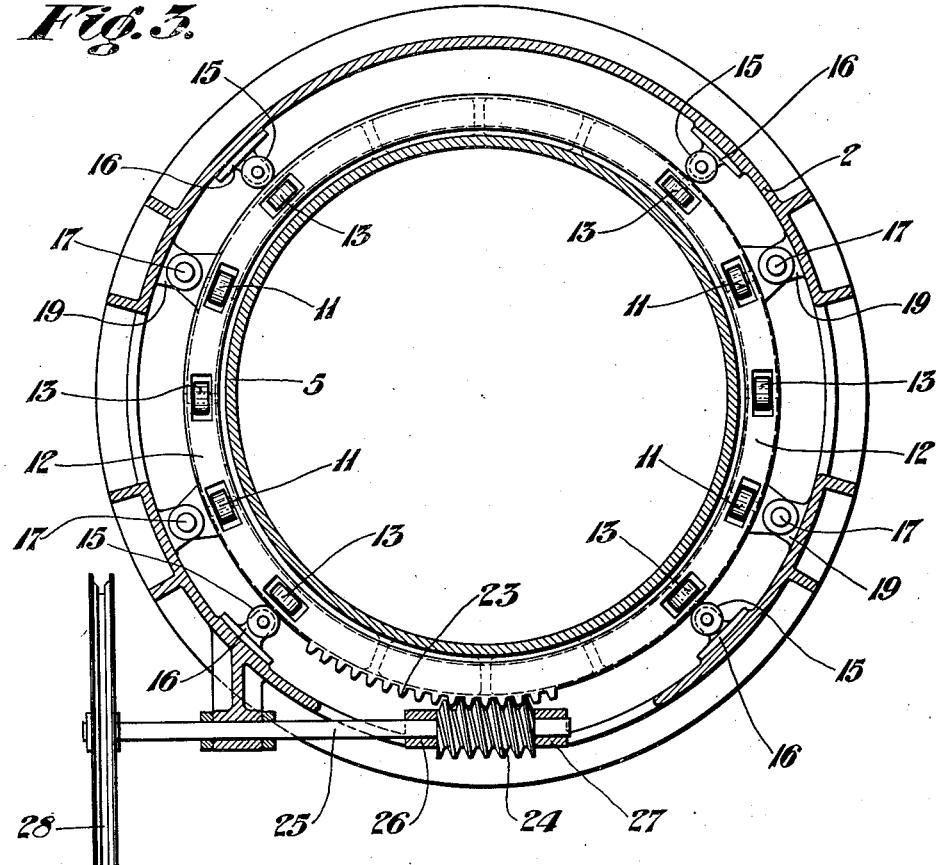
Figure 3 is a sectional elevation on the line III—III of Figure 2.
Figure 5:
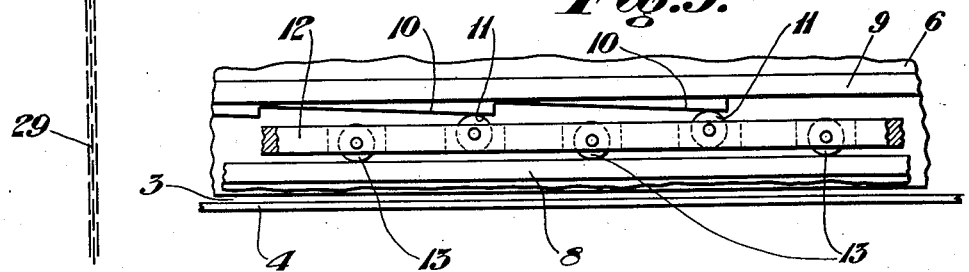
Figures 5 and 6 are fragmentary details showing the development of the operating cam surfaces.
Figure 4:
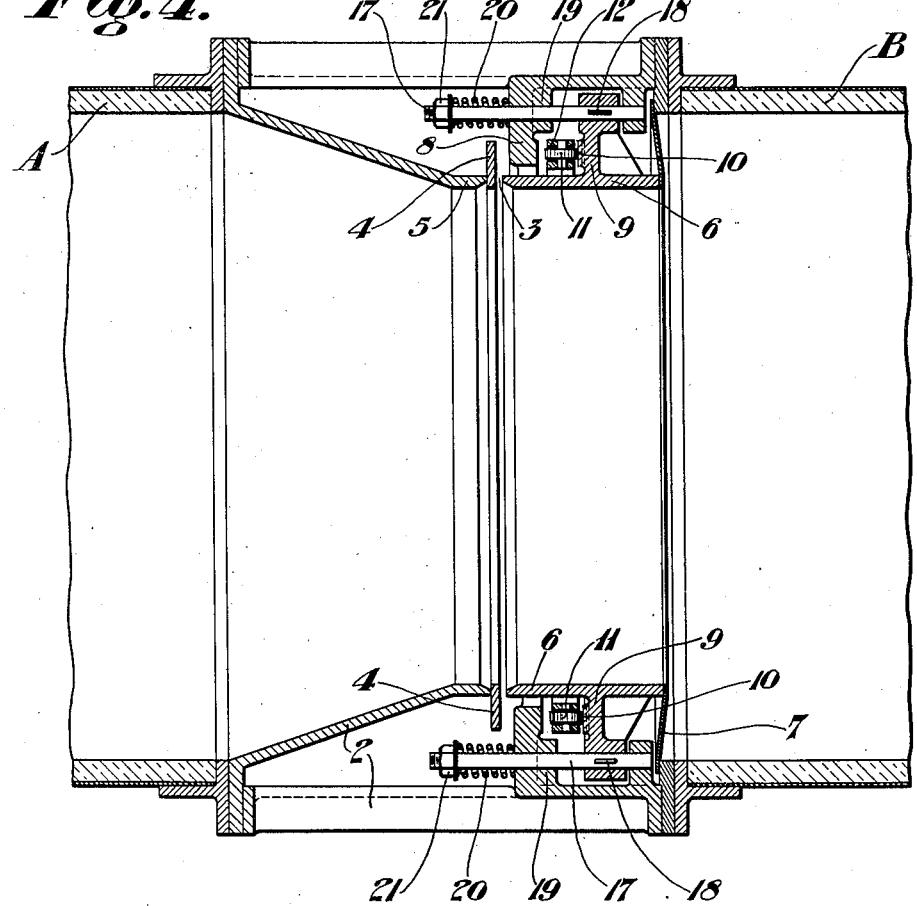
Figure 4 is a sectional plan on the line IV—IV of Figure 1.
Figure 6:
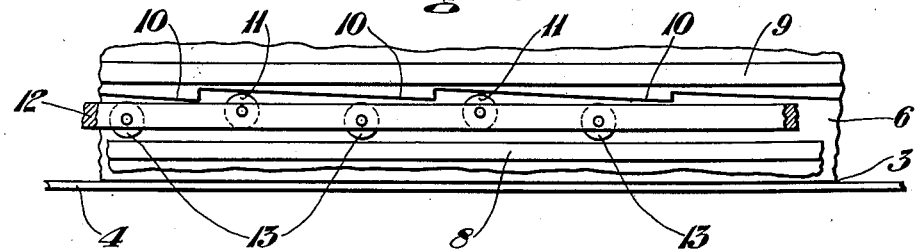

Referring more particularly to the drawings, the letters A and B designate sections of a pipe line between which the valve is mounted. The valve comprises a valve body or rigid distance piece 2 mounted between the pipe sections A and B and secured to the flanges thereof.

The body 2 has a vertical opening or passageway 3 therein, in which is mounted the reciprocating valve plate 4 of standard design. A rigid non-movable or fixed valve-seat 5 is formed integral with the body 2 on one side of the opening or passageway 3, and a movable valve-seat member 6 is mounted in the body 2 on the other side of the opening or passageway 3. The movable seat 6 is secured to the body 2 by a flexible diaphragm 7.

The valve body 2 is provided with an inwardly projecting shoulder or flange 8 on the movable seat side of the opening or passageway 3, and the movable valve-seat 6 is provided with an outer circumferential flange 9.

The flange 9 is provided on its forward face with a plurality of forwardly projecting or raised cam surfaces 10 adapted to be engaged by rollers 11 journaled in a roller-carrier ring 12 mounted around the seat 6. Other rollers 13 are journalled in the ring 12 and engage the rear face of the flange 8 so as to space the ring 12 between the flanges 8 and 9. It is obvious that the raised cam surfaces 10 may be located on the flange 8, so as to be engaged by the rollers 13, instead of on the flange 9 as shown, and that when desired, cam surfaces 10 may be provided on both of the flanges 8 and 9 so as to be engaged by the rollers 11 and 13.

Other or supporting rollers 15 are journaled in suitable brackets 16 on the body 2 and serve to form an anti-friction support for the ring 12.

A plurality of bolts 17 are removably keyed at 18 to the movable seat 6 and pass through suitable lugs 19 on the body 2, and serve to guide and support the movable seat 6.

Compression springs 20 are mounted around the portions of the bolts 17 projecting beyond the lugs 19 and are held under tension by nuts 21, so as to normally tend to force the seat 6 toward or against the valve plate 4, and to force said valve plate 4 against the rigid valve-seat 5, thereby forming a sealed joint between the valve plate and seats.

In order to release the valve plate 4, the ring 12 must be rotated to cause the rollers 11 to ride up on the high part of the cam surfaces 10, thereby forcing the seat 6 to move away from the valve plate 4 against the tension of the springs 20.

In order to rotate the ring 12, such ring is provided with a segment of a worm-wheel gear 23 cut in its circumferential face, and a worm-gear 24, mounted on a shaft 25, is meshed with the gear 23. The shaft 25 is journaled in bearings 26 and 27 on the body 2 and is provided at its outer end with a chain sheave 28 over which is trained a chain 29 for rotating the sheave and shaft, which in turn will rotate the ring 12 through the gears 23 and 24.

While we have shown and describe one specific embodiment of our invention, it will be understood that we do not wish to be limited thereto since various modifications may be made without departing from the scope of our invention as defined in the appended claims.

We claim:

1. A plate valve comprising a valve body having a valve plate passageway therein, a valve plate movably mounted in said passageway, a rigid non-movable valve-seat mounted on one side of said valve plate passageway, a movable seat mounted on the other side of said passageway, a plurality of cam faces on said movable seat member, an operating ring mounted around said movable seat member, rollers on said rings adapted to engage said cam faces and to force said movable seat away from said valve plate when said ring is rotated, and means for rotating said ring.

2. A plate valve comprising a valve body having a valve plate passageway therein, a valve plate movably mounted in said passageway, a rigid non-movable valve-seat mounted on one side of said valve plate passageway, a movable seat mounted on the other side of said passageway, a plurality of cam faces on said movable seat member, an operating ring mounted around said movable seat member, rollers on said ring adapted to engage said cam faces and to force said movable seat away from said valve plate when said ring is rotated, and hand operated means for rotating said ring.

3. A plate valve comprising a valve body having a valve plate passageway therein, a valve plate movably mounted in said passageway, a rigid non-movable valve-seat mounted on one side of said valve plate passageway, a movable seat mounted on the other side of said passageway, a retaining ring flange extending inwardly from said valve body, a cam flange on said movable seat, cam faces on said cam flange, an operating ring mounted between said flanges and adapted to rotate around said movable seat, rollers on said ring adapted to engage said cam faces and to force said movable seat away from said valve plate when said ring is rotated, and means for rotating said ring.

4. A plate valve comprising a valve body having a valve plate passageway therein, a valve plate movably mounted in said passageway, a rigid non-movable valve-seat mounted on one side of said valve plate passageway, a movable seat mounted on the other side of said passageway, a retaining ring flange extending inwardly from said valve body, a cam flange on said movable seat, cam faces on said cam flange, an operating ring mounted between said flanges and adapted to rotate around said movable seat, rollers on said ring adapted to engage said cam faces and to force said movable seat away from said valve plate when said ring is rotated, a segment of a worm-wheel on said ring, a worm-gear meshed with said segment, and means for rotating said worm to cause rotation of said ring.

5. A plate valve comprising a valve body having a valve plate passageway therein, a valve plate movably mounted in said passageway, a rigid non-movable valve-seat mounted on one side of said valve plate passageway, a movable seat mounted on the other side of said passageway, spring means normally tending to force said movable seat against said valve plate and to force said valve plate against said rigid non-movable seat to form a tight joint between said valve-seats and said valve plate, a plurality of cam faces on said movable seat member, an operating ring mounted around said movable seat member, means on said ring adapted to engage said cam faces and to force said movable seat away from said valve plate when said ring is rotated, and means for rotating said ring.

6. A plate valve comprising a valve body having a valve plate passageway therein, a valve plate movably mounted in said passageway, a rigid non-movable valve-seat mounted on one side of said valve plate passageway, a movable seat mounted on the other side of said passageway, spring means normally tending to force said movable seat against said rigid non-movable seat to form a tight joint between said valve-seats and said valve plate, a plurality of cam faces on said movable seat member, an operating ring mounted around said movable seat member, means on said ring adapted to engage said cam faces and to force said movable seat away from said valve plate when said ring is rotated, and hand operated mechanical means for rotating said ring.

7. A plate valve comprising a valve body having a valve plate passageway therein, a valve plate movably mounted in said passageway, a rigid non-movable valve-seat mounted on one side of said valve plate passageway, a movable seat mounted on the other side of said passageway, spring means normally tending to force said movable seat against said valve plate and to force said valve plate against said rigid non-movable seat to form a tight joint between said valve-seats and said valve plate, a ring retaining flange on said valve body and extending inwardly toward said movable valve-seat, a cam flange on said movable valve-seat, cam faces on said cam flange, an operating ring mounted between said flanges and adapted to rotate around said movable seat, rollers on said ring adapted to engage said cam faces and to force said movable seat away from said valve plate when said ring is rotated, and means for rotating said ring.

8. A plate valve comprising a valve body having a valve plate passageway therein, a valve plate movably mounted in said passageway, a rigid non-movable valve-seat mounted on one side of said valve plate passageway, a movable seat mounted on the other side of said passageway, spring means normally tending to force said movable seat against said valve plate and to force said valve plate against said rigid non-movable seat to form a tight joint between said valve-seats and said valve plate, a ring retaining flange on said valve body and extending inwardly toward said movable valve-seat, a cam flange on said movable valve-seat, cam faces on said cam flange, an operating ring mounted between said flanges and adapted to rotate around said movable seat, rollers on said ring adapted to engage said ring retaining flange, other rollers on said ring adapted to engage said faces and to force said movable seat away from said valve plate when said ring is rotated, and hand operated means for rotating said ring.

9. A plate valve comprising a valve body having a valve plate passageway therein, a valve plate movably mounted in said passageway, a rigid non-movable valve-seat mounted on one side of said valve plate passageway, a movable seat mounted on the other side of said passageway, spring means normally tending to force said movable seat against said valve plate and to force said valve plate against said rigid non-movable seat to form a tight joint between said valve-seats and said valve plate, a ring retaining flange on said valve body and extending inwardly toward said movable valve-seat, a cam flange on said movable valve-seat, cam faces on said cam flange, an operating ring mounted between said flanges and adapted to rotate around said movable seat, rollers on said ring adapted to engage said ring retaining flange, other rollers on said ring adapted to engage said cam faces and to force said movable seat away from said valve plate when said ring is rotated, a segment of a worm-wheel on said ring, an operating shaft, a worm-gear on said shaft, said worm-gear being meshed with said segment of a worm-wheel, and means for rotating said shaft to cause rotation of said ring.

10. A plate valve comprising a valve body having a valve plate passageway therein, a valve plate movably mounted in said passageway, a rigid valve-seat on one side and a movable valve-seat on the other side of said passageway, a plurality of cam faces on one valve-seat, an operating ring encircling one valve-seat, rollers on said ring adapted to engage said cam faces to cause relative movement of said valve-seats, and means for rotating said ring to cause a relative approach of the valve-seats.

In testimony whereof, we have hereunto set our hands.

CHARLES T. SIEBERT, Jr.
BRUCE WALTER.